United States Patent
Soni et al.

(10) Patent No.: US 8,265,216 B2
(45) Date of Patent: Sep. 11, 2012

(54) TECHNIQUES FOR ASYNCHRONOUS DATA RECOVERY

(75) Inventors: Samir J Soni, Gilbert, AZ (US); Uday Padmanabhan, Chandler, AZ (US); Michael D. Vicker, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 996 days.

(21) Appl. No.: 12/252,441

(22) Filed: Oct. 16, 2008

(65) Prior Publication Data

US 2010/0098150 A1    Apr. 22, 2010

(51) Int. Cl.
*H04L 7/00*    (2006.01)
(52) U.S. Cl. .................... 375/355; 375/354; 375/360
(58) Field of Classification Search .................. 375/355, 375/354, 360
See application file for complete search history.

(56) References Cited

U.S. PATENT DOCUMENTS

| | | |
|---|---|---|
| 5,367,542 A | 11/1994 | Guo |
| 6,269,137 B1 | 7/2001 | Colella et al. |
| 6,526,109 B1 | 2/2003 | Chang et al. |
| 6,847,789 B2 | 1/2005 | Savoj |
| 7,729,427 B2 * | 6/2010 | Kwok ........................... 375/257 |

* cited by examiner

*Primary Examiner* — Sam K Ahn
*Assistant Examiner* — Leila Malek
(74) *Attorney, Agent, or Firm* — Yudell Isidore Ng Russell PLLC (57) ABSTRACT

A data recovery circuit includes a pulse width indicator circuit, an edge detection circuit and a first storage. The pulse width indicator circuit is configured to receive, at an input, a data stream and provide pulses, at respective outputs, that are indicative of respective data bits in the received data stream. The edge detection circuit is configured to receive, on respective inputs, the pulses from the pulse width indicator circuit and provide respective storage signals, on respective outputs that are indicative of a logic level of the respective data bits, responsive to the pulses. The first storage is configured to receive and store the respective storage signals.

15 Claims, 5 Drawing Sheets

TECHNIQUES FOR ASYNCHRONOUS DATA RECOVERY

BACKGROUND

1. Field

This disclosure relates generally to data recovery and, more specifically, to techniques for asynchronous data recovery.

2. Related Art

Existing approaches for performing asynchronous data recovery have employed high-speed asynchronous interfaces (e.g., digital radio frequency third generation (DigRF3G), serializer/deserializer (SerDes), universal serial bus (USB) interfaces) that have utilized multiple phases of an internal clock to over-sample preamble bits of a data frame. Typically, based on a correlation phase selection algorithm, the interfaces have selected one of the clock phases to facilitate sampling of data bits in a data frame. In general, the approaches have required the generation of relatively accurate distributed clock phases, which may be provided by relatively simple digital dividers or relatively complex delay lock loops (DLLs). Unfortunately, in an interface that employs multiple clock phases, the effects of phase imbalance on performance of the interface is usually difficult to quantify.

Moreover, the design of high-speed asynchronous interfaces has become increasingly complex as bit rates of transmitted data has increased. For example, the design of digital radio frequency fourth generation (DigRF4G) interfaces (which may have bit rates greater than 2 gigabits/second) and SerDes interfaces (which may have bit rates greater than 1 gigabits/second) has been relatively complex. Furthermore, interfaces that employ multiple phase generation have relatively high power consumption, as the interfaces toggle at a rate that is at least twice the data rate, irrespective of a data duty cycle. Additionally, for interfaces that employ DLLs, power consumption is usually relatively high even after a phase is selected, as conventional high-speed asynchronous interfaces have usually continued to generate unwanted phases. In addition, as the interfaces have employed a sampling mechanism that is highly dependent on phase relationship, data frame size is also usually limited.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, the embodiments described below may be embodied in various wired or wireless communication devices.

The disclosed techniques are contemplated to be applicable to systems that employ various signaling techniques, e.g., orthogonal frequency division multiplex (OFDM) or single-carrier frequency division multiple access (SC-FDMA) signaling. A receiver of a base station (BS) and/or a subscriber station (SS) may be configured to decode data encoded using a number of different modulation schemes (e.g., phase shift keying (PSK), quadrature amplitude modulation (QAM)), depending upon which modulation scheme is scheduled. It should be appreciated that any of the various PSK, e.g., pi/2 BPSK, QPSK and 8-PSK, or QAM, e.g., 16-QAM and 64-QAM, modulation techniques may be implemented in a communication system constructed according to the present disclosure.

In general, design of high-speed serial interfaces (e.g., DigRF4G, serializer/deserialer (SerDes), and USB interfaces) that run at speeds greater than 1 GHz have become increasingly complex. According to one or more aspects of the present disclosure, a relatively low power architecture is employed to facilitate data recovery. In general, the architecture achieves power reduction as data over-sampling is not employed. Moreover, the architecture is relatively straight-forward as the architecture does not employ multiple phase clock generation or delay adjustments on internal clock (or incoming data signals) to locate an optimal sampling point on data bits. Additionally, the architecture does not exhibit data recovery bit-error-rate dependency on phase relationships and does not require clock-phase balancing. In general, the disclosed techniques asynchronously detect data bits, as contrasted with 'sampling' data bits. In one or more embodiments, after asynchronous detection, detected data bits are temporarily stored until the data bits are stable. The data bits can then be synchronously fetched (from the temporary storage) to a synchronous storage.

In one or more embodiments, data bits are asynchronously detected by detecting a number of consecutive ones ('1') and zeros ('0') associated with a high-speed asynchronous data stream using a pulse swallowing circuit (pulse width indicator circuit) that includes two chains of inverters that each include a series of unbalanced inverters. The pulse width indicator circuit generates pulse width indicators, which are essentially tap points from the pulse width indicator circuit that indicate a number of consecutive ones and zeros. An edge detection circuit generates "write 1" and "write 0" signals to temporary storage and a round-robin mask circuit is triggered, based on the pulse width indicators. The round-robin mask circuit controls a write mask for the temporary storage allowing only one storage location in the temporary storage to be written (i.e., set or reset when set-reset latches are employed) at any given time, while masking access to other storage locations.

With each valid write, the round-robin mask circuit shifts (rotates) the mask by one storage location to facilitate access to the other storage locations (one after the other) in a circular fashion. When the temporary storage is filled to a certain limit (e.g., eight, sixteen, or twenty-four bits for a 64-bit temporary storage), the round-robin mask circuit is configured to provide a clock enable signal to a clock gating circuit to allow synchronous fetching of data from the temporary storage. Upon receiving the clock enable signal, the clock gating circuit provides a clock signal to a clock input of a modulo ring counter that causes the counter to advance (e.g., for a 64-bit temporary storage the modulo ring counter counts from zero to sixty-three in a circular manner).

In one embodiment, in response to the clock signal, the modulo ring counter selects (e.g., using a multiplexer) one storage location at a time and feeds data into a synchronous shift register (where the data is considered to be in a synchronous domain). Advantageously, the disclosed data recovery circuit does not use multiple clock phase generation, data oversampling, complex algorithms for phase selection, and/or data tap point selection. In general, the disclosed data recovery circuit employs relatively straight-forward digital mechanisms to unambiguously determine data asynchronously. Since switching activities are limited based only on the data, power consumption of the disclosed data recovery circuit is relatively predictable and is contemplated to be relatively low, as compared to conventional solutions.

According to one embodiment of the present disclosure, a data recovery circuit includes a pulse width indicator circuit, an edge detection circuit, and a first storage. The pulse width indicator circuit is configured to receive, at an input, a data stream and provide, at respective outputs, pulses that are indicative of a logic level of respective data bits in the received data stream. The edge detection circuit is configured to receive, on respective inputs, the pulses from the pulse width indicator circuit and provide respective storage signals, on respective outputs, responsive to the pulses. The first storage is configured to receive and store the respective storage signals.

According to another embodiment of the present disclosure, a technique for recovering data from a data stream includes receiving, at an input of a pulse width indicator circuit, a data stream. Pulses are provided, at respective outputs of the pulse width indicator circuit, that are indicative of a logic level of respective data bits in the received data stream. The pulses are received on respective inputs of an edge detection circuit. Respective storage signals are provided, on respective outputs of the edge detection circuit, responsive to the pulses. The respective storage signals are received on respective inputs of a first storage. The respective storage signals are then stored in the first storage.

According to yet another embodiment of the present disclosure, a technique for recovering data from a data stream includes providing, at respective outputs of a pulse width indicator circuit, pulses that are indicative of a logic level of respective data bits in a received data stream. Respective storage signals are provided, on respective outputs of an edge detection circuit, responsive to the pulses. The respective storage signals are stored in the first storage. A respective trigger signal is provided, from a trigger output of the edge detection circuit, responsive to each of the pulses. Responsive to the respective trigger signal, respective bit storage units in a first storage are selectively enabled to receive and store the respective data bits recovered from the received data stream in the first storage in a circular manner.

Figure 1:
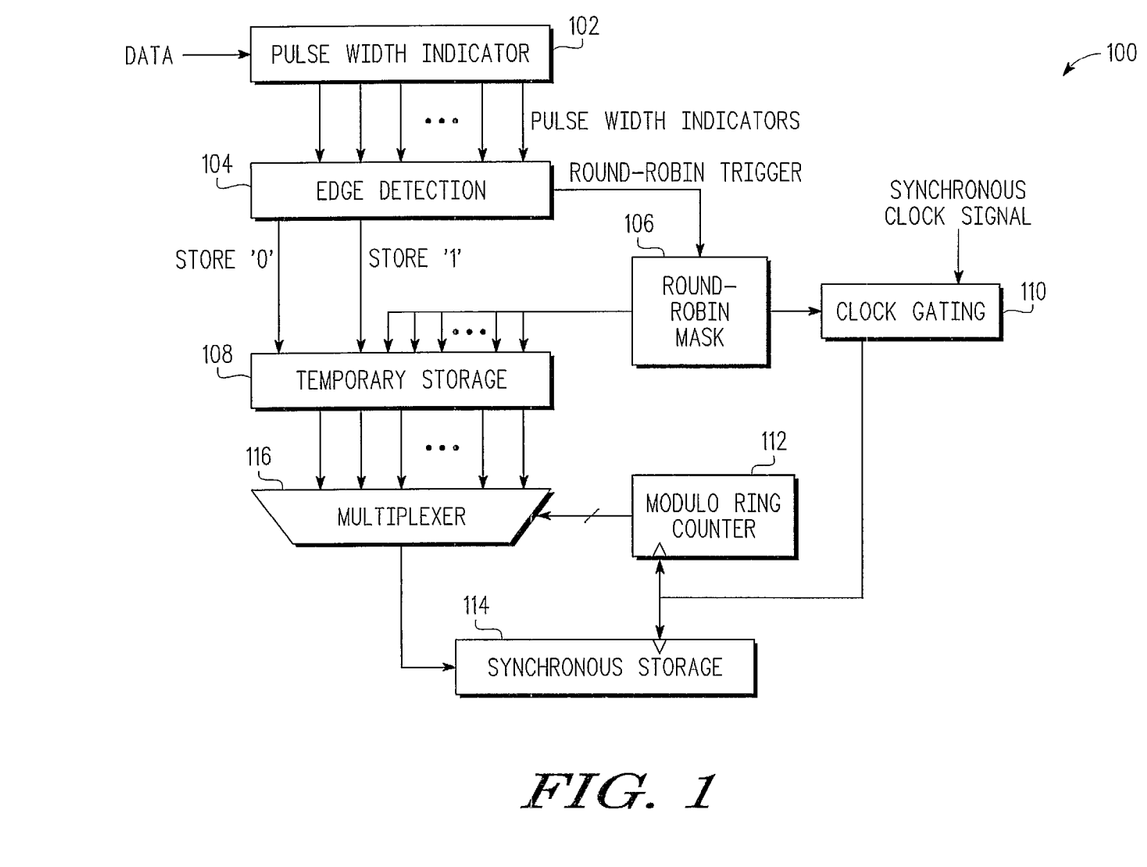
FIG. 1 is a diagram of an example data recovery circuit, configured according to an embodiment of the present invention, that may be employed to asynchronously recover data bits from a data stream.

With reference to FIG. 1, an example data recovery circuit 100, that is configured according to an embodiment of the present disclosure, is illustrated. As is shown, the circuit 100 includes a pulse width indicator circuit 102 that receives a data stream. The circuit 102 is configured to provide pulse width indicators to an edge detection circuit 104 responsive to a level of data bits in the data stream. The circuit 104 is configured to detect positive transition edges for positive pulses (ones) and negative transition edges for negative pulses (zeros). The circuit 104 generates one of two write signals, i.e., a write bit one (store '1') or a write bit zero (store '0'), responsive to whether a positive or a negative pulse, respectively, is detected. The circuit 104 is also configured to provide a round-robin trigger signal each time the circuit 104 generates either of the two write signals. The round-robin trigger signal is provided to a round-robin trigger input of a round-robin mask circuit 106. The circuit 106 controls a write mask for first storage (temporary storage) 108, allowing only one storage location within the first storage 108 to be written at a time.

With each valid write, the circuit 106 shifts the write mask by one location (which allows access to each of the storage locations in a circular fashion). When temporary storage 108 is filled up to a predefined limit, the round-robin mask circuit 106 is configured to provide a clock-enable signal to a clock gating circuit 110 to initiate synchronous data fetch from the first storage 108. The first storage 108 may be, for example, implemented with set-reset latches, a high-speed memory (e.g., static random access memory (SRAM)), or a register file. Upon receiving the clock signal, a modulo ring counter 112 selects one storage location at a time (or multiple storage locations) by providing an appropriate select signal to select inputs of multiplexer 116, which feeds the data to a synchronous shift register 114 (which is located in a synchronous domain of an integrated circuit (IC) that includes the data recovery circuit 100).

Figure 2:
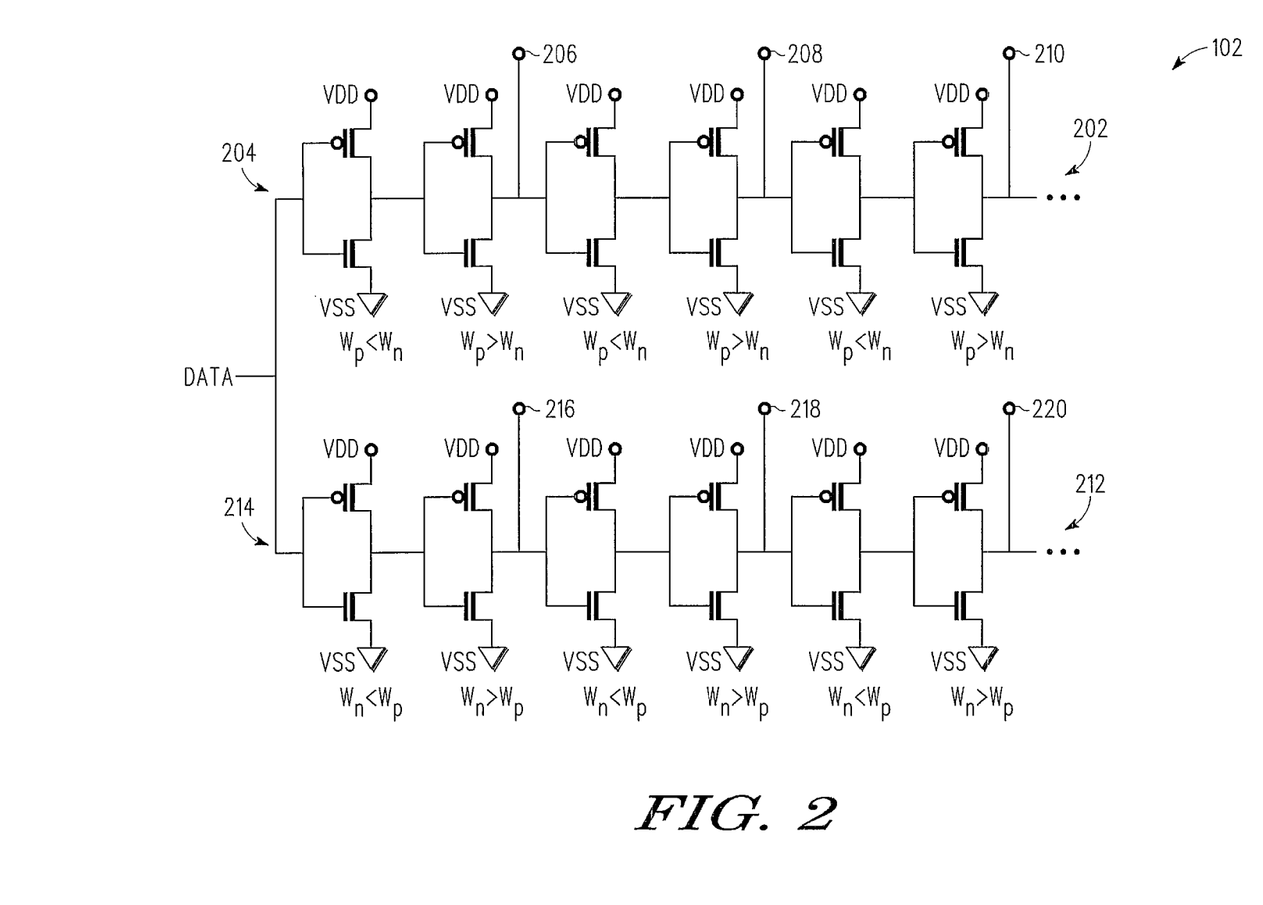
FIG. 2 is an example diagram of a pulse width indicator circuit that may be employed in the data recovery circuit of FIG. 1.

With reference to FIG. 2, in one embodiment, the pulse width indicator circuit 102 includes two chains of imbalanced inverters (i.e., a first chain 202 that is configured to detect positive pulses and a second chain 212 that is configured to detect negative pulses), which are configured to provide pulse width indicators. As is illustrated, the first chain 202 includes tap points 206, 208, and 210, which are positioned at an output of every other two inverters 204. Similarly, the second chain 212 includes tap points 216, 218, and 220, which are positioned at an output of every other two inverters 214. As is shown, a ratio of p-channel metal-oxide semiconductor field-effect transistors (MOSFET) and n-channel MOSFET channel widths at each stage in the complementary metal-oxide semiconductor (CMOS) inverter chains is selected to be imbalanced. Alternating the imbalance in the inverter chains at each inverter stage causes the inverter stages in an inverter chain to work on a same data edge. When a first inverter stage in an inverter chain has a p-channel MOSFET width (Wp) less than an n-channel MOSFET width (Wn), the inverter chain narrows a positive pulse. Similarly, when a first inverter stage in an inverter chain has an n-channel MOSFET width (Wn) less than a p-channel MOSFET width (Wp), the inverter chain narrows a negative pulse.

The inverter imbalance ratio determines the amount of pulse-width swallowing (i.e., how soon a pulse dies in an inverter chain). In this case, a wider pulse transitions through more inverter stages than a narrower pulse. The imbalance ratio can be optimally selected such that each inverter stage distinguishes between consecutive bits (e.g., an 'n' bit and 'n+1' bit) in a data stream. For example, a Wp/Wn ratio for a data stream having a data rate of 2 gigabits/second may be set to about 1:11 for a 90 nanometer process. As another example, a Wp/Wn ratio for a data stream having a data rate of 1 gigabits/second may be set to about 1:5 for a 90 nanometer process. It should be appreciated that a Wp/Wn ratio is dependent on an implemented process and device characteristics. As such, a Wp/Wn ratio for different 90 nanometer processes may vary. Moreover, a Wp/Wn ratio may vary widely between different processes, e.g., 65 nanometer, 90 nanometer, and 130 nanometer processes.

Figure 3:
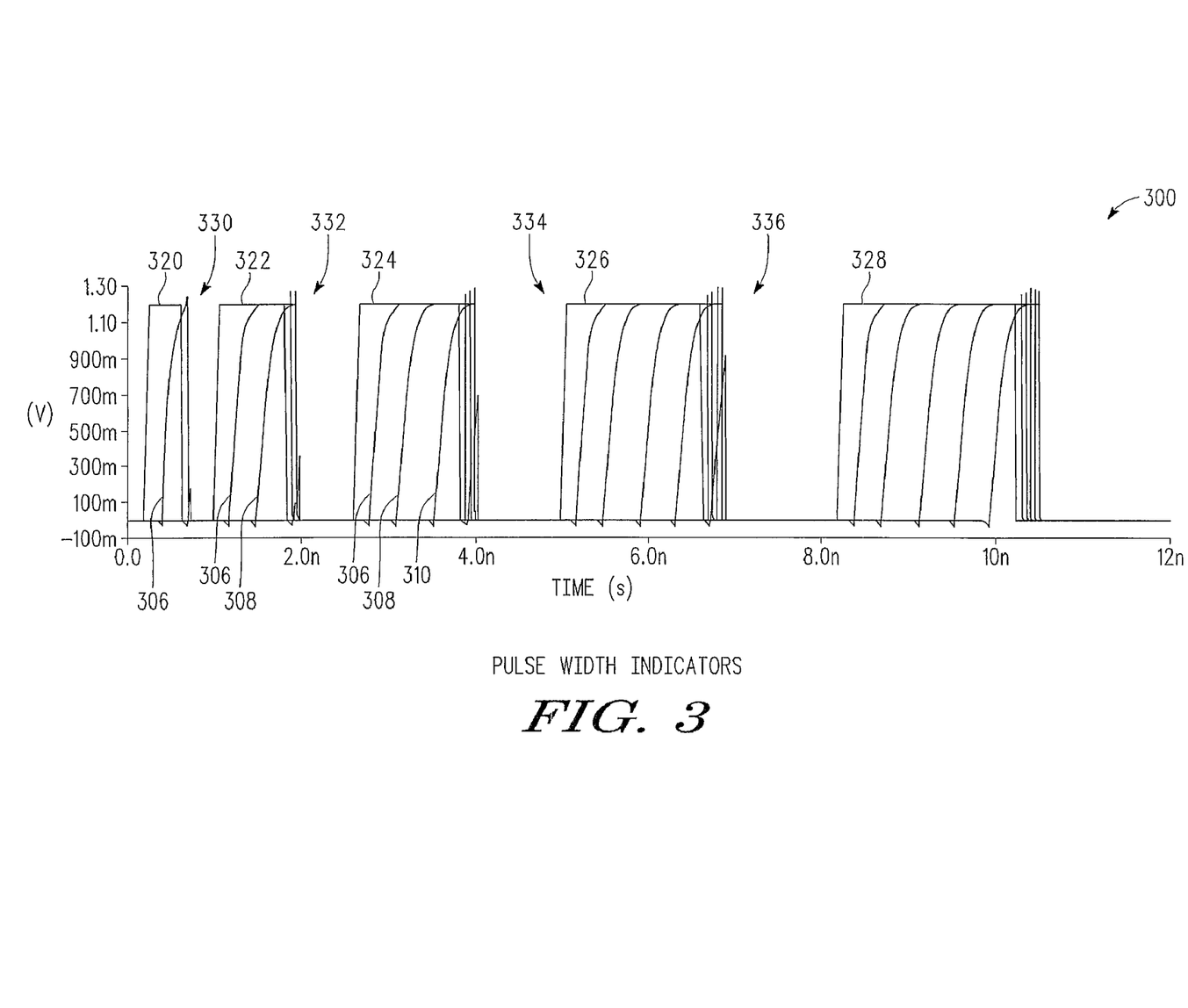
FIG. 3 is an example signal diagram that depicts example signals provided by the pulse width indicator circuit of FIG. 2.

With reference to FIG. 3, an example signal diagram 300 depicts pulse width indicators (pulses) provided at tap points 206-210 of the first chain 202 for positive pulses 320, 322, 324, 326, and 328 for a data stream that includes the data bits '10110011100011110001111'. It should be appreciated the second chain 212 provides similar pulse width indicators (not shown) for negative pulses 330, 332, 334, and 336. As noted above, the pulse width indicators are provided to the edge detection circuit 104, which provides appropriate storage signals to the temporary storage 108 and round-robin trigger signals to the round-robin mask circuit 106 responsive thereto.

Figure 4:
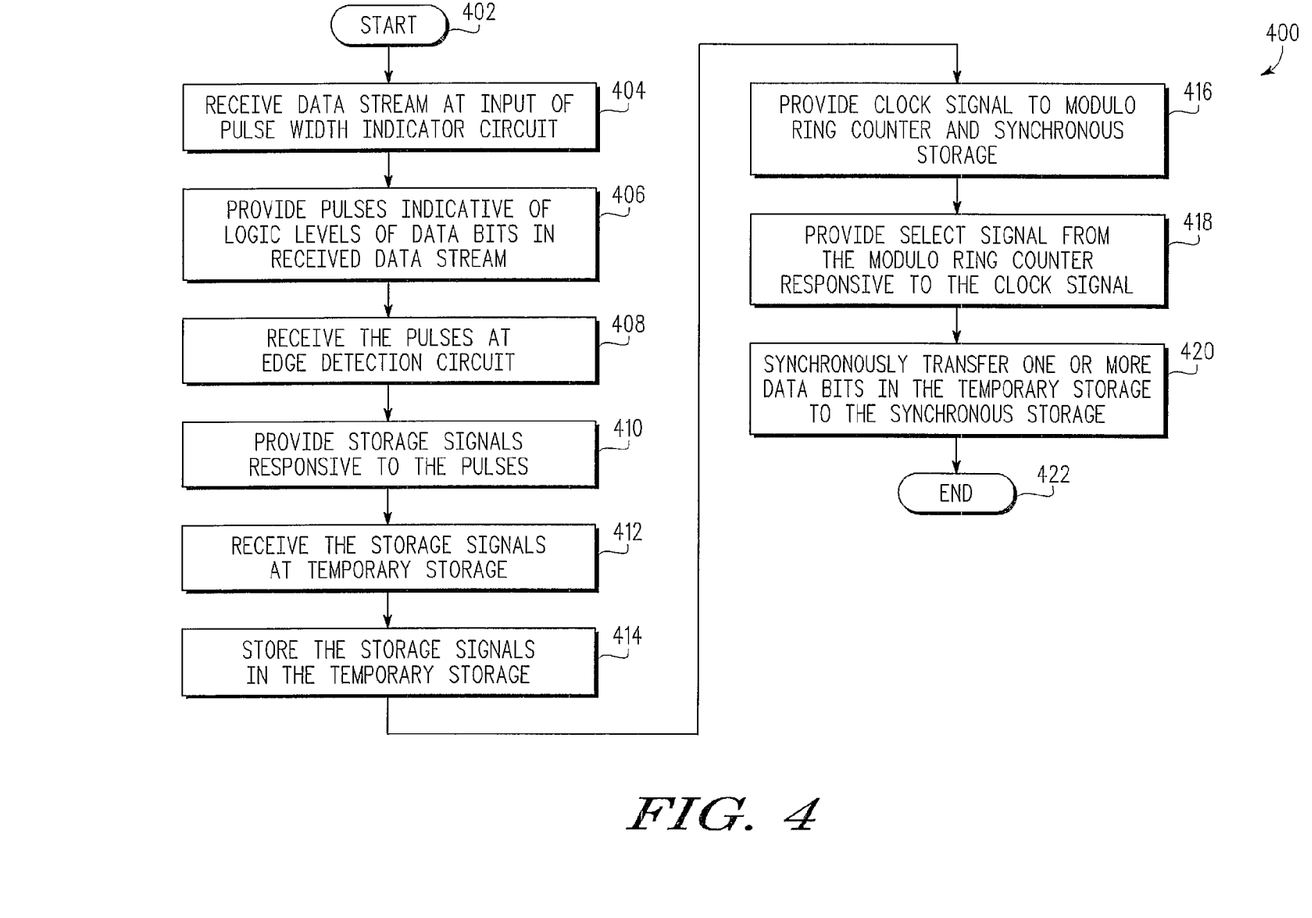
FIG. 4 is a flowchart of an example data recovery process that is configured according an embodiment of the present invention.

With reference to FIG. 4, an example data recovery process 400 is illustrated. To facilitate understanding, the process 400 is described in conjunction with the data recovery circuit 100 of FIG. 1. The process 400 is initiated in block 402, at which point control transfers to block 404. In block 404, an input of the pulse width indicator circuit 102 receives a data stream. Next, in block 406, respective outputs of the pulse width indicator circuit 102 provide pulses that are indicative of a logic level of respective data bits in the received data stream. Then, in block 408, respective inputs of the edge detection circuit 104 receive the pulses from the pulse width indicator circuit 102. Next, in block 410, the edge detection circuit 104 provides, on respective outputs, respective storage signals responsive to the pulses. Then, in block 412, the first storage 108 receives, on respective inputs, the respective storage signals.

Next, in block 414, the respective storage signals are stored in the first storage 108. Then, in block 416, responsive to each of the pulses, the edge detection circuit 104 provides a respective trigger signal on a trigger output. For example, the round-robin mask circuit 106 may receive, at an input, the respective trigger signal. In response to the respective trigger signal, respective bit storage units in the first storage 108 are selectively enabled (by the round-robin mask circuit 106) to receive and store (in a circular manner) the respective data bits recovered from the received data stream. Next, in block 418, respective clock inputs of the modulo ring counter 112 and the synchronous storage 114 are selectively provided (via the clock gating circuit 110) a clock signal. Then, respective select outputs of the modulo ring counter 112 provide a select signal responsive to the clock signal. Next, in block 420, one or more data bits are synchronously transferred from the first storage 108 to the synchronous storage 114 responsive to the clock signal. Following block 420, the process 400 terminates and control returns to a calling process in block 422.

Figure 5:
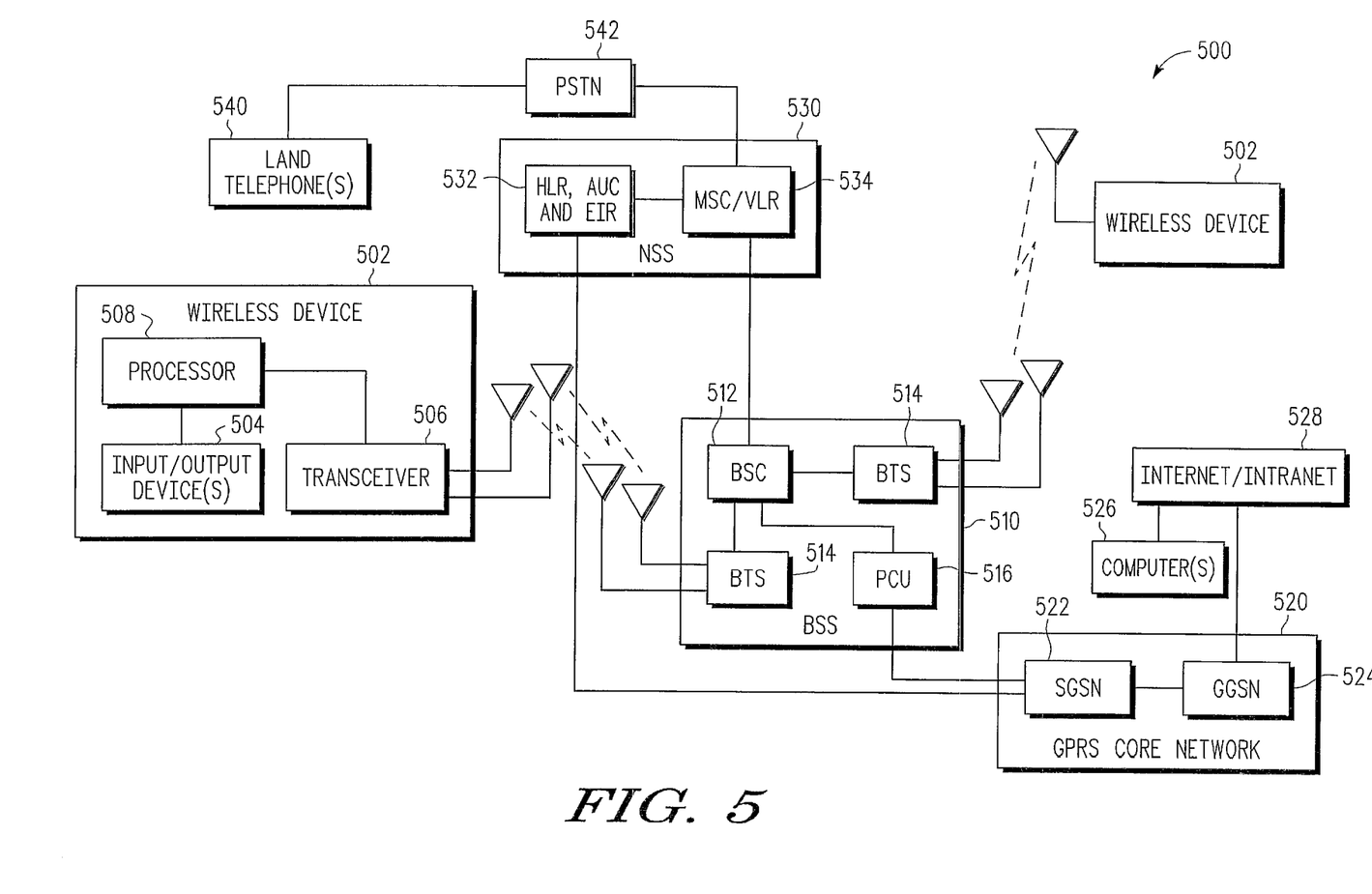
FIG. 5 is a block diagram of an example wireless communication system that may be configured to perform asynchronous data recovery according to various embodiments of the present invention.

With reference to FIG. 5, an example wireless communication system 500 is depicted that includes a plurality of subscriber stations or wireless devices 502, e.g., hand-held computers, personal digital assistants (PDAs), cellular telephones, etc., that may implement data recovery according to one or more embodiments of the present disclosure. In general, the wireless devices 502 include a processor 508 (e.g., a digital signal processor (DSP)), a transceiver 506, and one or more input/output devices 504 (e.g., a camera, a keypad, display, etc.), among other components not shown in FIG. 5. According to various embodiments of the present disclosure, the disclosed data recovery techniques may be implemented within the wireless device 502. The wireless devices 502 communicates with a base station controller (BSC) 512 of a base station subsystem (BSS) 510, via one or more base transceiver stations (BTS) 514, to receive or transmit voice and/or data and to receive control signals. In general, the BSC 512 may also be configured to choose a modulation and coding scheme (MCS) for each of the devices 502, based on channel conditions.

The BSC 512 is also in communication with a packet control unit (PCU) 516, which is in communication with a serving general packet radio service (GPRS) support node (SGSN) 522. The SGSN 522 is in communication with a gateway GPRS support node (GGSN) 524, both of which are included within a GPRS core network 520. The GGSN 524 provides access to computer(s) 526 coupled to Internet/intranet 528. In this manner, the wireless devices 502 may receive data from and/or transmit data to computers coupled to the Internet/intranet 528. For example, when the devices 502 include a camera, images may be transferred to a computer 526 coupled to the Internet/intranet 528 or to another one of the devices 502. The BSC 512 is also in communication with a mobile switching center/visitor location register (MSC/VLR) 534, which is in communication with a home location register (HLR), an authentication center (AUC), and an equipment identity register (EIR) 532. In a typical implementation, the MSC/VLR 534 and the HLR, AUC, and EIR 532 are located within a network and switching subsystem (NSS) 530, which performs various functions for the system 500. The SGSN 522 may communicate directly with the HLR, AUC, and EIR 532. As is also shown, the MSC/VLR 534 is in communication with a public switched telephone network (PSTN) 542, which facilitates communication between wireless devices 502 and land telephone(s) 540.

Accordingly, data recovery techniques have been disclosed herein that are not dependent on multiple sampling clock-phases. As such, delay lock loops (DLLs) or other phase lock loop (PLL) type structures are not required to generate multiple clock phases. According to one or more disclosed embodiments, an accurate data recovery system may be implemented that is not dependent on a relationship among multiple sampling phases. As such, an interface constructed according to the present disclosure does not exhibit high power consumption posed by multiple clocks phase generation and over-sampling and preamble correlation methods or complex hardware requirements.

In summary, an interface constructed according to the present disclosure asynchronously recovers data by detecting pulse widths in a high-speed data bit stream using a pulse width indicator circuit that indirectly detects a number of consecutive '1s' and consecutive '0s'. The detected bits are asynchronously stored in a temporary storage until the detected bits in the temporary storage are stable. The detected bits are then synchronously transferred to a clock domain of an associated system. Advantageously, over-sampling and/or correlation methods are not required to be employed to recover data from an in-coming high-speed data stream. The high-speed data bit stream is fed to the pulse width indicator circuit which, in turn, generates a series of 'pulse width indicator' signals, which are provided from tap points (in the pulse width indicator circuit), which indicate a width of positive and/or negative pulses in the data bit stream, hence representing a number of consecutive '1s' and '0s'.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

Although the invention is described herein with reference to specific embodiments, various modifications and changes can be made without departing from the scope of the present invention as set forth in the claims below. For example, many of the techniques disclosed herein are broadly applicable to a variety of reference signals employed in wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data recovery circuit, comprising:
    a pulse width indicator circuit configured to receive, at an input, a data stream and provide, at respective outputs, pulses that are indicative of a logic level of respective data bits in the received data stream;
    an edge detection circuit having respective inputs coupled to the respective outputs of the pulse width indicator circuit, wherein the edge detection circuit is configured to receive, on the respective inputs, the pulses from the pulse width indicator circuit and provide, on respective outputs, respective storage signals responsive to the pulses; and
    a first storage having respective storage inputs coupled to the respective outputs of the edge detection circuit, wherein the first storage is configured to receive and store the respective storage signals, and wherein the pulse width indicator circuit includes a first inverter chain that detects positive pulses and a second inverter chain that detects negative pulses, wherein the first and second inverter chains each include a series of alternating imbalanced inverter stages.

2. The data recovery circuit of claim 1, wherein the edge detection circuit further includes a trigger output that is configured to provide a respective trigger signal responsive to each of the pulses and the data recovery circuit further comprises:
    a round-robin mask circuit having an input coupled to the trigger output of the edge detection circuit and respective mask outputs coupled to respective mask inputs of the first storage, wherein the round-robin mask circuit is configured to receive the respective trigger signal and selectively enable respective bit storage units in the first storage to receive and store the respective data bits recovered from the received data stream in the first storage in a circular manner.

3. The data recovery circuit of claim 2, further comprising:
    a clock gating circuit having a first input coupled to a clock enable output of the round-robin mask circuit, a second input coupled to a synchronous clock that provides a clock signal, and a clock output configured to selectively provide the clock signal;
    a modulo ring counter having an input coupled to the clock output of the clock gating circuit and respective select outputs for providing a select signal;
    a synchronous storage having a clock input coupled to the clock output of the clock gating circuit; and
    a multiplexer having respective select inputs coupled to the respective select outputs of the modulo ring counter, respective data inputs coupled to respective data outputs of the respective bit storage units and a data output coupled to a data input of the synchronous storage, wherein the round-robin mask circuit is configured to provide respective clock enable signals following a determined number of the pulses to facilitate synchronous transfer, for each of the respective clock enable signals, of one or more of the data bits in the first storage to the synchronous storage.

4. The data recovery circuit of claim 3, wherein the first storage is an asynchronous storage and the synchronous storage is a shift register.

5. The data recovery circuit of claim 1, wherein the first storage is selected from a group consisting of set-reset latches, high-speed memory, and a register file.

6. A method for recovering data from a data stream, comprising:
    receiving, at an input of a pulse width indicator circuit, a data stream;
    providing pulses, at respective outputs of the pulse width indicator circuit, that are indicative of a logic level of respective data bits in the received data stream;
    receiving, on respective inputs of an edge detection circuit, the pulses from the pulse width indicator circuit;
    providing respective storage signals, on respective outputs of the edge detection circuit, responsive to the pulses;
    receiving the respective storage signals, on respective inputs of a first storage;
    providing, from a trigger output of the edge detection circuit, a respective trigger signal responsive to each of the pulses;
    receiving, at an input of a round-robin mask circuit, the respective trigger signal; and
    selectively enabling, using the round-robin mask circuit, respective bit storage units in the first storage to receive and store the respective storage signals in the first storage in a circular manner responsive to the respective trigger signal, wherein the respective storage signals correspond to the respective data bits recovered from the received data stream, wherein the pulse width indicator circuit includes a first inverter chain that detects positive pulses and a second inverter chain that detects negative pulses, and wherein the first and second inverter chains each include a series of alternating imbalanced inverter stages.

7. The method of claim 6, further comprising:
selectively providing, to respective clock inputs of a modulo ring counter and a synchronous storage, a clock signal;
providing a select signal, at respective select outputs of the modulo ring counter, responsive to the clock signal; and
synchronous transferring one or more of the data bits in the first storage to the synchronous storage responsive to the clock signal.

8. The method of claim 7, wherein the first storage is an asynchronous storage and the synchronous storage is a shift register.

9. The method of claim 6, wherein the first storage is selected from a group consisting of set-reset latches, high-speed memory, and a register file.

10. A method for recovering data from a data stream, comprising:
providing, at respective outputs of a pulse width indicator circuit, pulses that are indicative of a logic level of respective data bits in a received data stream;
providing, on respective outputs of an edge detection circuit, respective storage signals responsive to the pulses;
providing, from a trigger output of the edge detection circuit, a respective trigger signal responsive to each of the pulses; and
selectively enabling respective bit storage units in a first storage to receive and store the respective storage signals, which correspond to the respective data bits recovered from the received data stream, in the first storage in a circular manner responsive to the respective trigger signal.

11. The method of claim 10, further comprising:
selectively providing, to respective clock inputs of a modulo ring counter and a synchronous storage, a clock signal;
providing a select signal, at respective select outputs of the modulo ring counter, responsive to the clock signal; and
synchronous transferring one or more of the data bits in the first storage to the synchronous storage responsive to the clock signal.

12. The method of claim 11, wherein the first storage is an asynchronous storage and the synchronous storage is a shift register.

13. The method of claim 10, wherein the first storage is selected from a group consisting of set-reset latches, high-speed memory, and a register file.

14. The method of claim 10, wherein the pulse width indicator circuit includes a first inverter chain that detects positive pulses and a second inverter chain that detects negative pulses.

15. The method of claim 14, wherein the first and second inverter chains each include a series of alternating imbalanced inverter stages.

* * * * *